United States Patent [19]

Gibbs

[11] Patent Number: 5,469,805
[45] Date of Patent: Nov. 28, 1995

[54] HIGH VISIBILITY VALVE POSITION INDICATOR

[75] Inventor: Stephen Gibbs, Glasgow, Scotland

[73] Assignee: Keystone International Holdings Corp., Houston, Tex.

[21] Appl. No.: 178,755

[22] Filed: Jan. 7, 1994

[30] Foreign Application Priority Data

Aug. 22, 1992 [GB] United Kingdom ................... 9217917
Aug. 2, 1993 [EP] European Pat. Off. ................ 9330691

[51] Int. Cl.⁶ ............................ F16K 37/00; G01O 5/00; G09F 11/02
[52] U.S. Cl. ........................ 116/284; 116/277; 116/282; 137/556; 40/473; 40/601
[58] Field of Search ..................................... 116/277, 282, 116/284, 303, DIG. 21; 137/551, 556, 556.3; 40/473, 601

[56] References Cited

U.S. PATENT DOCUMENTS

| 473,488 | 4/1892 | Wood | 116/277 |
|---|---|---|---|
| 824,163 | 6/1906 | Whitney | 116/277 |
| 951,927 | 3/1910 | Whitney | 116/277 |
| 1,201,894 | 10/1916 | Thompson | 116/277 |
| 2,485,942 | 10/1949 | Turner . | |
| 2,768,604 | 10/1956 | Enerud | 116/282 |
| 2,829,538 | 4/1958 | Mueller . | |
| 3,148,701 | 9/1964 | Bagwell . | |
| 3,238,915 | 3/1966 | Smith et al. . | |
| 3,460,565 | 8/1969 | Sanderson . | |
| 3,771,765 | 11/1973 | Scapes . | |
| 3,804,056 | 4/1974 | Lee et al. . | |
| 3,910,308 | 10/1975 | Mack . | |
| 4,046,350 | 9/1977 | Massey et al. . | |
| 4,194,529 | 3/1980 | Hargraves et al. . | |
| 4,219,021 | 8/1980 | Fink . | |
| 4,235,258 | 11/1980 | Uno et al. . | |
| 4,311,169 | 1/1982 | Gaillard . | |
| 4,355,659 | 10/1982 | Kelchner . | |
| 4,494,566 | 1/1985 | Sinclair et al. | 116/277 |
| 5,220,942 | 6/1993 | Garvin, Jr. et al. | 116/277 |

FOREIGN PATENT DOCUMENTS

| 0092714 | 11/1983 | European Pat. Off. . | |
|---|---|---|---|
| 1733558 | 11/1956 | Germany . | |
| 2207391 | 8/1973 | Germany . | |
| 797896 | 7/1958 | United Kingdom . | |
| 1304331 | 1/1973 | United Kingdom | 116/282 |
| 2229254 | 9/1990 | United Kingdom . | |

*Primary Examiner*—William A. Cuchlinski, Jr.
*Assistant Examiner*—Andrew Hirshfeld
*Attorney, Agent, or Firm*—Browning, Bushman, Anderson & Brookhart

[57] ABSTRACT

A high visibility indicator 12 for fitting to the rotatable drive shaft 11 of a rotary actuator 10 is capable of being rotated from a first position to a second position to indicate corresponding first and second positions of the actuator 10. The indicator 12 has an inner cylindrical member 13 fitted to the shaft 11, an outer cylindrical member 15 secured to the housing 10 of the actuator 10, and a sleeve member 17 interposed between members 13, 15 and drivingly connected to each via pin and slot connections 15A, 19, 14A, 18, which are arranged so that rotary movement of inner member 13 produces axial movement of sleeve member 17. The members 13, 15, 17 have color-coded surfaces arranged such that when the sleeve member 17 is at one end of its axial travel, a first color-coded arrangement is visible and when the sleeve member 17 is at the other end of its axial travel, a second color-coded arrangement is visible.

18 Claims, 2 Drawing Sheets

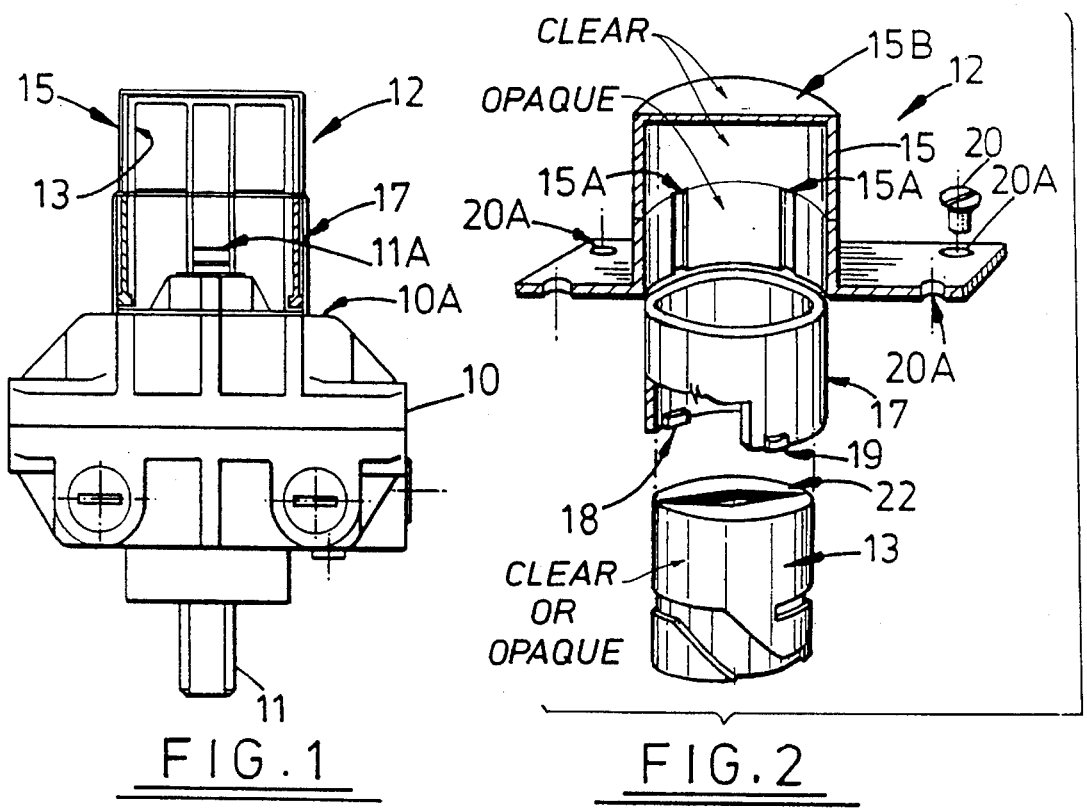
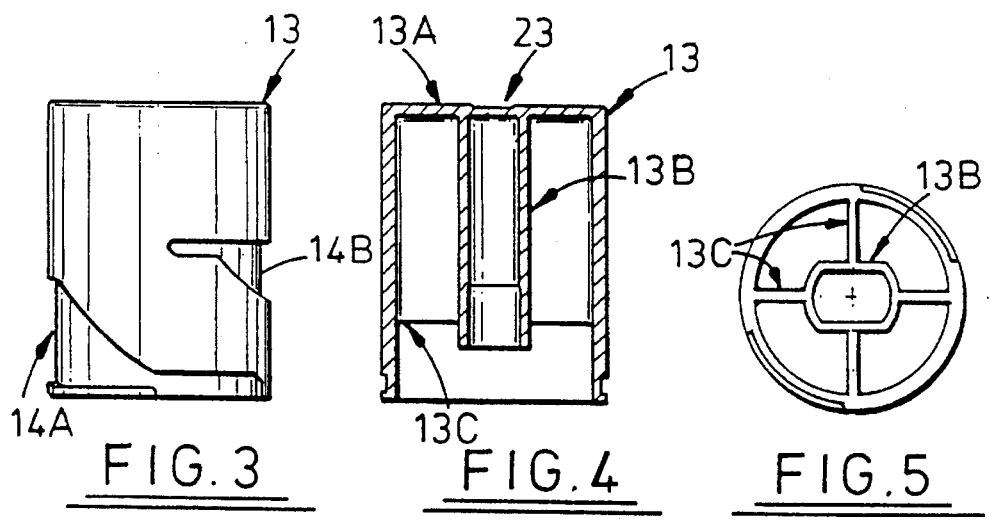

HIGH VISIBILITY VALVE POSITION INDICATOR

BACKGROUND OF THE INVENTION

1. Field of the Invention

This invention relates to a high visibility indicator for use with a rotary actuator in order to provide a visual indication, which is viewable from a distance, of the rotary position of the actuator.

2. Description of the Prior Art

Various forms of high visibility indicators are already known, for example as described in European Patent Specification No. 0092714 and U.S. Pat. Nos. 3,238,915; 2,485,942; 3,238,968; and 4,494,556. The present invention is concerned with an alternative form of position indicator that has enhanced visibility, is easy to manufacture, has few component pans and, preferably, when disassembled is easy to reassemble correctly.

Rotary actuators are typically used to drive the spindle of a valve fitted into a pipeline for carrying fluids that may be either gaseous or liquid, in which case the actuator is a 90° actuator. However, such actuators may also be used to actuate a pivotally mounted door or to drive a linearly moving shutter door or to drive component pans of a conveyor system. In some situations the rotary actuator is designed to have a travel significantly greater than 90°, for example 120° or 180°, and in most situations the actual travel of the actuator can be 4° or 5° greater than its intended use. Thus, a 90° actuator may be capable of travelling through about 100°, the 10° overrun of the actuator being partly available at both ends of the desired 90° travel.

SUMMARY OF THE INVENTION

According to the present invention, there is provided a high visibility indicator for fitting directly or indirectly to the rotatable drive shaft of a rotary actuator and that is capable of being rotated from a first rotary position to a second rotary position, the indicator comprising inner and outer cylindrical members and a sleeve member interposed between the inner and outer cylindrical members and drivingly connected to each, the inner cylindrical member being adapted for connection to the shaft of the actuator, the outer cylindrical member being adapted to be secured to the housing of the actuator, and the driving connections of the sleeve member being arranged such that rotary motion of the inner cylindrical member results in axial motion of the sleeve member, the members of the indicator being provided with coded surfaces arranged such that a first coded arrangement is visible when the sleeve member is at one end of its axial travel and a second coded arrangement is visible when the sleeve member is at the other end of its axial travel for respectively indicating the first and second rotary positions of the actuator.

The inner and outer cylindrical members are preferably provided with end caps or closures at their ends remote from the actuator. The closures may be planar or coned or domed. The sleeve member preferably has an axial extent of about half that of the cylindrical members. The coded surfaces, preferably color-coded surfaces, may be arranged such that the outer cylindrical member has an opaque surface for half of its axial extent and transparent thereafter, the sleeve member being a different color, and the inner cylindrical member may be entirely transparent or entirely colored, although various other forms of color, or other, coding are possible. For example, the outer cylindrical member could be entirely transparent and the inner cylindrical member could be provided with a first color for half of its axial extent and a second color for the other half of its axial extent, with the sleeve member also being colored.

It will be understood that in the field of indicating arrangements for fluid carrying pipelines, there is an existing color-coding convention relating to the installation environment where yellow indicates the general environment, green indicates a gas hazard, blue indicates an electrical hazard, and red indicates a fire hazard. When the indicator shows only a single one of these colors, the valve is closed; but when it shows one of these colors in association with black, the valve is open.

In a preferred arrangement of the present invention, the sleeve member is colored black while the inner cylindrical member is wholly colored either yellow, green, blue or red and the lower half of the outer cylindrical member is the same color as the inner cylindrical member whereas the upper half of the outer cylindrical member is transparent. Thus, when the valve is in one position, conventionally the closed position, the indicator indicates a 360° band of yellow superimposed on a 360° band of yellow, but when the valve is in its other position, which conventionally is its open position, the indicator indicates a 360° band of black superimposed on a 360° band of yellow.

The driving connections of the sleeve member are preferably pin and slot connections that function in the nature of cam and follower connections. It is preferred that the sleeve carry the pins and that the slots be provided on the surfaces of the inner and outer cylindrical members, in which case the slot on the inner cylindrical member forms part of a helix and the slot on the outer cylindrical member extends axially. It is preferred that each pin and slot connection be one of a set of pin and slot connections in order to distribute loading and reduce dependency on a single pin. Conveniently, there are four vertical pin and slot connections and two helical pin and slot connections. Conveniently, the helical slots terminate in circumferential slots at each end of the helix to accommodate the overruns of the actuator at each end of its desired travel.

It is preferred that the members of the indicator be made from molded plastics material to provide for high quality optical finishes so that transparency is long lasting and color definition is maintained with minimal aging.

It is also preferred that the driving connection between the inner cylindrical member and the shaft of the actuator be non-circular to provide for uniqueness in the orientation of the connection. It is also preferred that the outer cylindrical member be secured to the housing of the actuator by bolts that are rectangularly orientated rather than being disposed about a square around the rotational axis of the actuator shaft. Additionally, it is preferred that the inner cylindrical member end cap or closure be provided with a permanent direction indicating arrow (which may be bi-directional) to indicate the open position of the valve, while the sleeve member-in addition to being colored black, which, when externally visible, indicates that the valve is open-also carries an imprint of the word OPEN.

It will be appreciated that the members of the indicator may additionally carry an imprint of the word CLOSED, where appropriate, and may also be provided with graduation markings to provide at least a preliminary indication of the extent of movement of the actuator between its two positions.

In the preferred embodiment the sleeve member is driven between its two axial positions in a vertically upward direction, but in a modified arrangement the sleeve member could be driven in a vertically downward direction.

BRIEF DESCRIPTION OF THE DRAWINGS

An embodiment of the present invention will now be described by way of example with reference to the accompanying drawings, in which:

FIG. 1 is an elevational view, partly in section, of a high visibility indicator mounted on a rotary actuator;

FIG. 2 is an exploded view of the indicator of FIG. 1 with portions of the components cut away for clarity;

FIG. 3 is an elevational view of the inner cylindrical member of the high visibility indicator;

FIG. 4 is an elevational, cross-sectional view of the inner cylindrical member shown in FIG. 3; and FIG. 5 is a bottom plan view of the inner cylindrical member shown in FIG. 3.

DESCRIPTION OF THE PREFERRED EMBODIMENT

Figure 6:
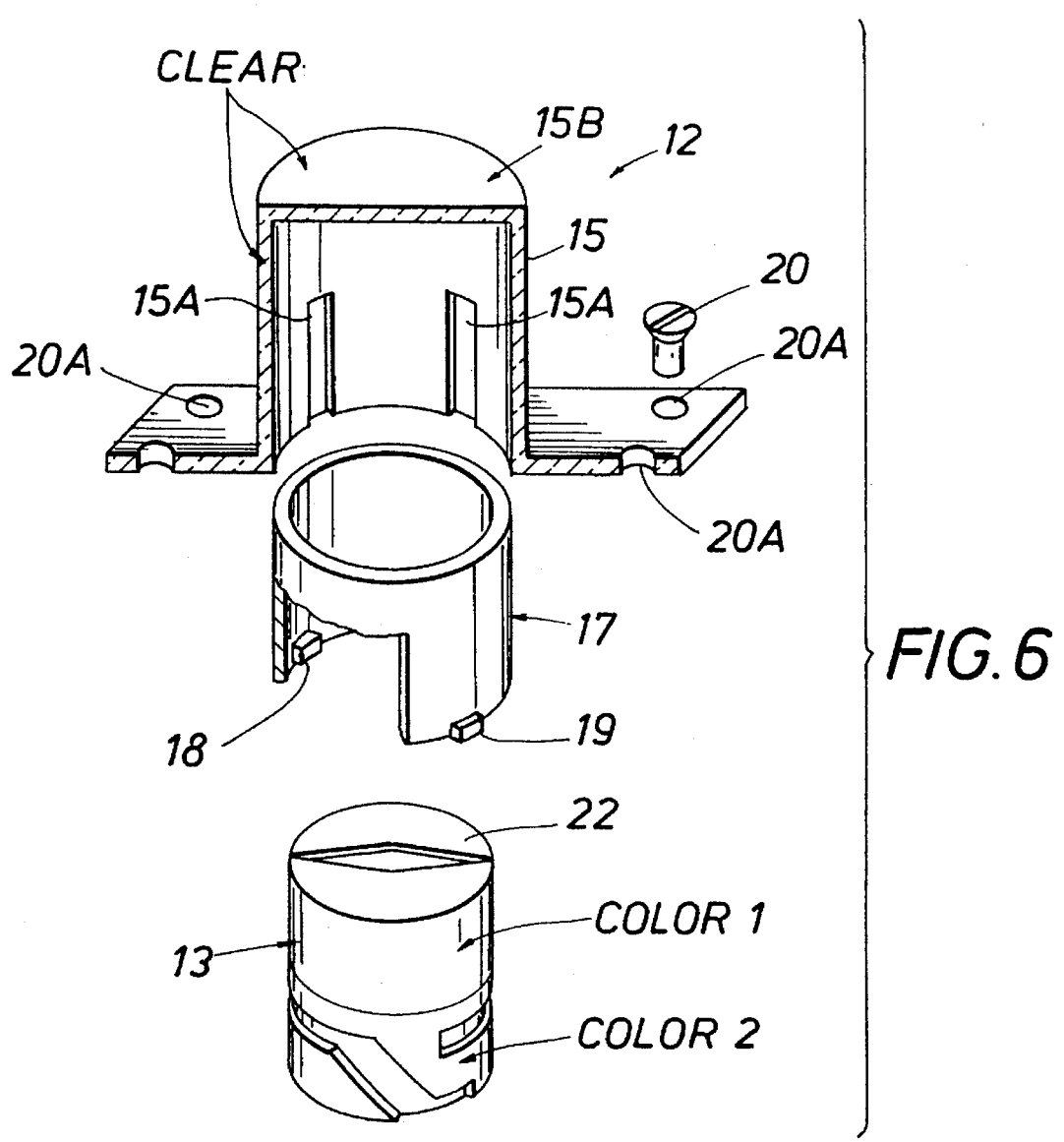
FIG. 6 is an exploded view of an alternative embodiment of the indicator of FIG. 1 with portions of the components cut away for clarity.

In FIG. 1 a 90° rotary actuator 10 has an output shaft 11 that is adapted to drive a mechanism, the position of which is to be varied. The mechanism may be a valve connected into a fluid carrying pipeline. The other, or top end 11A of the shaft 11, protrudes from the upper surface 10A of the actuator housing and is there connected, as will be explained, to operate a high visibility indicator 12. FIG. 2 shows the indicator 12 in exploded format as comprising an inner cylindrical member 13, an outer cylindrical member 15 and a sleeve member 17 that is interposed between the inner and outer cylindrical members 13, 15. The inner member 13 is secured to the shaft end 11A and rotates with the shaft, while the outer member 15 is secured to the surface 10A of the housing of the actuator 10 and therefore is non-rotatable. The sleeve member 17 is drivingly connected to both inner member 13 and outer member 15, as will be explained in such a manner that when inner member 13 rotates, sleeve member 17 moves axially. For this purpose the axial extent of sleeve member 17 is substantially less than the axial extent of members 13 and 15. It is preferred that sleeve member 17 is approximately half the height of cylindrical members 13 and 15.

FIGS. 3, 4 and 5 show different views of inner cylindrical member 13 in greater detail. As shown in FIG. 4, member 13 is essentially a hollow body with an upper end cap or closure 13A from which depends a centralized tubelike structure 13B for gripping the shaft end 11A. Structure 13B, at least at its free end, has a shape that conforms to that of the shaft end 11A being non-circular. In this instance the shaft end is provided with opposed parallel flats so that the free end of structure 13B has the form of a "double D," as shown in 5. Webs 13C are provided for strengthening purposes. The outer cylindrical surface of the member 13 is profiled with a pair of similar helical groove or slot formations 14A, 14B being disposed 180° displaced from each other. Each formation 14A, 14B essentially consists of a helical portion that at its upper and lower ends terminates in a circumferentially extending portion. These groove formations 14A, 14B receive respective pin members 18 formed on the inner surface of sleeve member 17 (only one being visible in FIG. 2 due to part of the wall of the member 17 being cut away). The pin members 18 preferably have some circumferential length in order to provide strength, and for this reason the helical portion of formations 14A and 14B are likewise provided with circumferential width.

The outer surface of sleeve member 17 additionally carries four pin members 19 (of which only one is visible in FIG. 2), and these pin members ride in vertical slot formations 15A formed on the inner cylindrical surface of outer member 15 (two of which are visible in FIG. 2 because part of member 15 is cut away). Thus, when shaft end 11A rotates, it provides a rotary drive to inner member 13, the formations 14A, 14B of which drive the inner pin members 18 of the sleeve member 17 and in turn the outer pin members 19 on sleeve member 17 connect drivingly with slots 15A on outer cylindrical member 15, which finally is constrained against rotary movement by virtue of bolts 20 that secure the member 15 to the housing surface 10A via bolt holes 20A. In consequence sleeve member 17 is constrained to move axially.

In reference again to FIG. 1, the sleeve member 17 is shown with shading in the interest of clarity and is in its lowermost position, which is at one end of its axial travel. In this position it lies behind the lower half of the outer member 15, which preferably is opaque and color-coded (yellow, for example). The upper half of the outer member 15 is preferably transparent while the entirety of the inner member 13 is preferably opaque and color-coded (yellow, for example). Thus, in FIG. 1 the indicator 12 indicates with yellow surmounted by yellow, and black is hidden from view. However, when the shaft 11 is rotated, the black sleeve member 17 is elevated to the other end of its travel so that the visible indication becomes yellow surmounted by black.

An alternative embodiment of the indicator is illustrated in FIG. 6. In this embodiment, the outer cylindrical member 15 is entirely transparent and the inner cylindrical member 13 includes a first color (color 1) for a first half of its axial extent and a second color (color 2) for a second half of its axial extent.

In order to render the indicator 12 visually effective in an omni-directional manner, the upper end closure 13A of inner member 13 is provided with a bidirectional arrow 22 (as shown in FIG. 2) that is viewable from above through the transparent upper end closure 15B of the outer member 15. The arrow is aligned with the flats on the shaft end 11A and therefore indicates the direction of the butterfly of the valve. Aligned with the pipeline conventionally denotes valve open and transverse to the pipeline conventionally denotes valve closed.

In order to guide the rotary movement of the inner member, it is preferred to provide a bearing in the mating surfaces of end closures 15B and 13A. Typically, this may take the form of a small protrusion from closure 15B and a corresponding depression in closure 13A, the latter being indicated at 23 in FIG. 4.

With regard to disassembly and reassembly of the indicator 12, it will be noted that slot formations 14A, 14B are 180° apart so that the sleeve member 17 can be fitted to the inner cylindrical member 13 in two positions but both are effectively the same because arrow 22 is bidirectional. The sleeve member 17 can then be fitted to the outer cylindrical member 15 in one of four possible orientations when the slots 15A are equi-angularly spaced, but this is effectively two pairs of positions-one pair has arrow 22 aligned and the other pair has arrow 22 transverse with respect to the longitudinal center of the base plate of the outer cylindrical member 15, which contains the four bolt holes 20A. The outer member 15 thereafter can be fitted to the housing surface 10A of the actuator 10 in either of two positions, but both are effectively the same while the inner member 13 can be fitted to the shaft end 11A in either of two positions, both of which are effectively the same. The entire indicator 12 can therefore only be fitted to the entire actuator 10 with the visible indication provided by the actuator correct or wrong for the actual position of the actuator shaft 11. It is within the skill of the fitter to identify a "wrong" indication from a comparison with the actual position of the actuator shaft 11 since shaft end 11A has two flats and take effective action by removing sleeve member 17 from the outer member 15 and replacing it after a 90° turn.

The described indicator 12 with outer member 15 having four slots 15A can be used either on actuators 10 that are aligned with the pipeline or on actuators that are transverse to the pipeline. In a modification the outer member 15 is provided in two different forms: one with only two diametrically opposed slots 15A (and sleeve member 17 has only two outer pins 19) oriented for an aligned actuator, and the other with only two diametrically opposed slots 15A oriented for a transverse actuator. With this modification, provided the correct outer member 15 is used in the application, the fitter does not require to use any skill whatsoever. Additionally, of course, a similar result can be achieved with a four slot outer member 15 in which two slots are blanked off with releasable inserts, making the indicator of universal application when provided with initial instructions to the user to reposition the blanking inserts if the application is to a transverse actuator. In this case sleeve member 17 only has two outer pins 19.

While in the foregoing description the indicator 12 is directly fitted to the actuator 10, it may be fitted to a switch box or positioner that in turn is fitted to the actuator 10. As is well known, switch boxes are signalling devices operating electrically or pneumatically to output a signal to a remote receiving station for denoting the status of the actuator (and, for example, may operate a mimic diagram) whereas positioners receive signals from a remote station to fine-tune the position adopted by the actuator. In both cases there is an upwardly projecting shaft end corresponding to item 11A and a housing surface corresponding to item 10A to which the indicator 12 may be fitted.

What is claimed is:

1. A high visibility indicator adapted to be attached to a rotary actuator having a rotatable shaft and a housing, said indicator comprising an inner cylindrical member, an outer cylindrical member and a sleeve member interposed between said inner and outer cylindrical members and drivingly connected to each of said inner and outer cylindrical members between first and second terminal positions, the inner cylindrical member being adapted for connection to said shaft of said actuator, the outer cylindrical member being adapted to be secured to said housing of said actuator, said driving connections arranged such that rotational motion of the inner cylindrical member results in axial motion of said sleeve member, the outer cylindrical member being opaque for a first half of its axial extent and being transparent for a second half of its axial extent, said sleeve member being a different color from the first half of the axial extent of the outer cylindrical member, and said inner cylindrical member being surfaced such that said indicator displays a first color-coded arrangement when said sleeve member is at said first terminal position and a second color-coded arrangement when said sleeve member is at said second terminal position.

2. The indicator of claim 1 wherein said inner cylindrical member is entirely transparent.

3. The indicator of claim 1 wherein said inner cylindrical member is entirely colored.

4. The indicator of claim 1 wherein said sleeve member has an axial extent of about half of the axial extent of said inner cylindrical member.

5. The indicator of claim 1 wherein said inner and outer cylindrical members are provided with end caps at their ends remote from said actuator.

6. The indicator of claim 5 wherein said end caps are generally planar.

7. The indicator of claim 1 wherein the driving connection between the sleeve member and the inner cylindrical member and the driving connection between the sleeve member and the outer cylindrical member comprise pins and slots that function in the nature of cam and follower connections.

8. The indicator of claim 7 wherein said pins are provided on said sleeve member and said slots are provided on the surfaces of said inner and outer cylindrical members, the slots on the inner cylindrical member forming part of a helix and the slots on the outer cylindrical member extending axially.

9. The indicator of claim 8 wherein there are four slots on said outer cylindrical member and there are two helical slots on said inner cylindrical member.

10. The indicator of claim 9 wherein the helical slots terminate in circumferential slots at each end of the helix to accommodate overruns of the actuator at each end of the desired travel of the actuator.

11. A high visibility indicator adapted to be attached to a rotary actuator having a rotatable shaft and a housing, said indicator comprising an inner cylindrical member, an outer cylindrical member, and a sleeve member interposed between said inner and outer cylindrical members and drivingly connected to each of said inner and outer cylindrical members between first and second terminal positions, the inner cylindrical member being adapted for connection to said shaft of said actuator, the outer cylindrical member being adapted to be secured to said housing of said actuator, said driving connections arranged such that rotational motion of the inner cylindrical member results in axial motion of said sleeve member, said outer cylindrical member being entirely transparent, said inner cylindrical member being provided with a first color for a first half of its axial extent and a second color for the other half of its axial extent, the sleeve member also being colored such that said indicator displays a first color-coded arrangement when said sleeve member is at said first terminal position and a second color-coded arrangement when said sleeve member is at said second terminal position.

12. The indicator of claim 11 wherein said sleeve member has an axial extent of about half of the axial extent of said inner cylindrical member.

13. The indicator of claim 11, wherein said inner and outer cylindrical members are provided with end caps at their ends remote from said actuator.

14. The indicator of claim 13 wherein said end caps are generally planar.

15. The indicator of claim 11 wherein the driving connection between the sleeve member and the inner cylindrical member and the driving connection between the sleeve member and the outer cylindrical member comprise pins and slots that function in the nature of cam and follower connections.

16. The indicator of claim 15 wherein said pins are provided on said sleeve member and said slots are provided on the surfaces of said inner and outer cylindrical members, the slots on the inner cylindrical member forming part of a helix and the slots on the outer cylindrical member extending axially.

17. The indicator of claim 16 wherein there are four slots on said outer cylindrical member and there are two helical slots on said inner cylindrical member.

18. The indicator of claim 17 wherein the helical slots terminate in circumferential slots at each end of the helix to accommodate overruns of the actuator at each end of the desired travel of the actuator.

* * * * *